Patented July 20, 1954

2,684,371

UNITED STATES PATENT OFFICE 2,684,371

PROCESS FOR THE PRODUCTION OF DIPHENYLHYDANTOIN

Joseph Levy, Union, N. J., assignor to Nopco Chemical Company, Harrison, N. J., a corporation of New Jersey No Drawing. Application December 15, 1950, Serial No. 201,069

11 Claims. (Cl. 260—309.5)

This invention relates to a process for producing diphenylhydantoin, and more particularly to a process for producing in very high yields diphenylhydantoin having a high degree of purity.

Processes which disclose the production of diphenylhydantoin are quite well known in the art. In U. S. Patent No. 2,409,754 of Henze, a process is described whereby diphenylhydantoin is produced by reacting 1 mole of benzophenone with 1 mole of an alkali-metal cyanide and 3 moles of ammonium carbonate in aqueous ethyl alcohol at about 60° C. Another process has been disclosed in Ber. 44, 411 (1911) wherein 12 grams of urea are reacted with 25 grams of benzil, both reactants being dissolved in a boiling solution of 5 grams of sodium and 600 cc. of ethyl alcohol. Based on the amount of benzil employed, the yield of diphenylhydantoin from this process was approximately 70%. Eight grams of diphenyl-acetylendiurein, an undesired by-product, were obtained. The diphenylacetylendiurein is formed by two molecules of urea combining with one molecule of benzil.

It is the object of this invention to provide an improved process for the production of diphenylhydantoin.

A further object of the invention is to provide an economical process for producing in very high yields diphenylhydantoin having a very high degree of purity.

Other objects of this invention will in part be obvious and will in part appear hereinafter.

It has been discovered that the above and other objects of the invention may be accomplished by reacting urea with benzil in a highly alkaline, concentrated aqueous methanol medium. It has been found that by employing such a reaction medium certain definite advantages over prior art processes are attained. The prior art processes which utilized alkaline ethanolic reaction mediums used such mediums which were relatively quite dilute in respect to the concentration of alkali contained therein. In the process of the present invention aqueous methanolic mediums containing a high concentration of alkali are employed. By operating in this manner the formation of diphenylacetylendiurein is very effectively reduced and correspondingly higher yields of diphenylhydantoin are obtained. Furthermore the process of the invention gives diphenylhydantoin having a very high degree of purity.

The aqueous methanol employed in the process of the invention contains from about 5% to about 20% of water. It has been found that the best results are obtained by this process, however, when the water content of the aqueous methanol is maintained within a range of from about 15% to about 20%.

The alkali employed can be any strong alkaline reagent, such as, sodium, potassium, lithium, the hydroxides, methylates, hydrides thereof, etc., although I usually prefer to use potassium hydroxide. At least about four moles of alkali and preferably about five moles of alkali per liter of aqueous methanol are employed. From about one to one and one-half liters of the highly alkaline concentrated aqueous methanol solution are employed for each mole of benzil present in the reaction mixture.

In carrying out the process of the invention, it is preferred that the urea and benzil employed be in powdered form. By proceeding in this manner the reaction is facilitated due to the greater surface area of the reactants. Of course, the use of urea and benzil in powdered form is purely optional, and urea and benzil in any available form can be employed in this process with outstanding results. The sequence in which these two reactants are added to the reaction mixture is not critical and therefore they can be added separately or in combination without affecting the excellent results obtained by the process of the invention. From about one and one-half to two moles of urea are employed for each mole of benzil.

It has been found that the most efficient method, and therefore the preferred method, of carrying out this reaction involves chilling the highly alkaline concentrated aqueous methanol solution to about 0° C. prior to the addition of urea and benzil. By proceeding in this manner, upon adding the reactants, the reaction takes place smoothly with almost complete solution being accomplished followed by a subsequent rise in temperature. After thorough admixture the solution is then heated to reflux temperature and preferably maintained at this temperature for about one to two hours. If desired, the reaction can be begun at room temperature followed by subsequent heating to reflux as described above; however, by proceeding in this manner, the reaction proceeds very vigorously and is not easily controlled.

On completion of the reaction the diphenylhydantoin is readily recovered from the reaction mixture. Thus, when refluxing is completed, the reaction mixture is diluted with an excess of water resulting in the precipitation of any diphenylacetylendiurein which may have been produced. This reaction by-product is readily removed by filtration from the alkaline mixture and the diphenylhydantoin can then be precipitated from the clear solution by one of two procedures. The first of these involves merely acidifying the alkaline filtrate with an acid, such as hydrochloric acid, sulfuric acid, etc., until complete precipitation of the diphenylhydantoin is effected. The product is then separated from the solution by filtration and is subsequently washed with water. The second method, and the one preferably employed, involves acidifying the alkaline filtrate with an acid, such as hydrochloric acid, sulfuric acid, etc., up to the point of precipitation. Carbon dioxide gas is then bubbled in and the complete precipitation of the diphenylhydantoin is effected. The precipitate is then removed from the solution by filtration and finally washed free of acid with water. The diphenylhydantoin is obtained in yields of 90% or over, and is obtained in a very high state of purity.

Diphenylhydantoin is extremely valuable due to the fact that its sodium salt because of its anticonvulsant activity is a drug effectively employed in the treatment of epilepsy. Diphenylhydantoin can be readily converted into its valuable sodium salt by reacting the diphenylhydantoin with a calculated amount of sodium hydroxide or sodium methylate dissolved in methanol. When the reaction is complete, the bulk of the methanol is removed from the reaction mixture by direct distillation and the remainder can then be removed by azeotropic distillation with toluene.

For a fuller understanding of the nature and objects of this invention, reference may be had to the following example which is merely given as a further illustration of the invention and is not to be construed in a limiting sense.

*Example*

A solution of potassium hydroxide in aqueous methanol was prepared by dissolving 146 grams of potassium hydroxide in 90 cc. of water with cooling and the subsequent addition of this solution to 450 cc. of methanol also with cooling. The solution was further chilled to 0° C. and 47.2 grams of urea and 94.5 grams of benzil were added with stirring. The reaction took place with almost complete solution of these materials, followed by the separation of a fine, white precipitate. The precipitation was accompanied by a rise in temperature to about 12° C. The mixture was then stirred for about five minutes and then gradually warmed to reflux over a period of about ten minutes. This mixture became very thick at about 40-50° C. but eventually thinned out. After a few minutes at reflux the precipitate had completely dissolved leaving a light yellow solution. This solution was refluxed for one hour, then diluted with 1350 cc. of water and the diluted solution cooled to about 5° C. This resulted in the separation of a flocculent precipitate which was removed by filtration. The weight of this product was 5.0 grams and it consisted essentially of the by-product diphenyl-acetylendiurein. The diphenylhydantoin was then precipitated from the alkaline filtrate by acidifying the filtrate with hydrochloric acid. The precipitated diphenylhydantoin was then filtered from the reaction mixture and washed free of acid with water. The diphenylhydantoin was obtained as light tan needles in a yield of 106.3 grams or 94% theory. It had a melting point of 293–296° C.

That this procedure is a substantial improvement over the procedures disclosed in the prior art may be readily seen when the quality and the quantity of the products produced by this process and the relative ease with which they are obtained are compared with those produced by prior art processes. The yield obtained from the process, herein disclosed, substantially exceeds the yield disclosed in Ber. 44, 411 (1911). That procedure resulted in the formation of a large quantity of the by-product diphenyl-acetylendiurein which, of course, is undesirable. I have also found that by using methanol, diphenylhydantoin is obtained having a lighter color and therefore a more desirable color than the products obtained from those prior art processes which employed ethanol as the reaction medium. In addition, I have found that by using methanol, the amount of solvent necessary for the reaction can be reduced considerably thus producing a saving which is magnified many times when the process is carried out on a large production scale.

Having described my invention what I claim as new and desire to secure by Letters Patent is:

1. In a process for reacting urea with benzil, the improvement which comprises carrying out the reaction in an alkaline aqueous methanol reaction medium, the aqueous methanol containing from about 5% to about 20% of water and having dissolved therein per liter at least about four moles of an alkaline reagent selected from the class consisting of the alkali metals, the alkali metal hydroxides, the alkali metal methylates, and the alkali metal hydrides.

2. In a process for reacting urea with benzil, the improvement which comprises carrying out the reaction in an alkaline aqueous methanol reaction medium, the aqueous methanol containing from about 5% to about 20% of water and having dissolved therein per liter at least about four moles of potassium hydroxide.

3. In a process for reacting urea with benzil, the improvement which comprises carrying out the reaction in an alkaline aqueous methanol reaction medium, the aqueous methanol containing from about 5% to about 20% of water and having dissolved therein per liter at least about four moles of sodium hydroxide.

4. In a process for reacting urea with benzil, the improvement which comprises carrying out the reaction in an alkaline aqueous methanol reaction medium, the aqueous methanol containing from about 5% to about 20% of water and having dissolved therein per liter at least about four moles of potassium methylate.

5. In a process for reacting urea with benzil, the improvement which comprises carrying out the reaction in an alkaline aqueous methanol reaction medium, the aqueous methanol containing from about 5% to about 20% of water and having dissolved therein per liter at least about four moles of sodium methylate.

6. In a process for reacting urea with benzil, the improvement which comprises carrying out the reaction in an alkaline aqueous methanol reaction medium, the aqueous methanol containing from about 5% to about 20% of water and having dissolved therein per liter at least about four moles of sodium.

7. In a process for reacting urea with benzil, the improvement which comprises carrying out the reaction in an alkaline aqueous methanol reaction medium, the aqueous methanol containing from about 15% to about 20% of water and having dissolved therein per liter about five moles of potassium hydroxide.

8. In a process for reacting urea with benzil, the improvement which comprises carrying out the reaction in an alkaline aqueous methanol reaction medium, the aqueous methanol containing from about 15% to about 20% of water and having dissolved therein per liter about five moles of sodium hydroxide.

9. In a process for reacting urea with benzil, the improvement which comprises carrying out the reaction in an alkaline aqueous methanol reaction medium, the aqueous methanol containing from about 15% to about 20% of water and having dissolved therein per liter about five moles of potassium methylate.

10. In a process for reacting urea with benzil, the improvement which comprises carrying out the reaction in an alkaline aqueous methanol reaction medium, the aqueous methanol containing from about 15% to about 20% of water and having dissolved therein per liter about five moles of sodium methylate.

11. In a process for reacting urea with benzil, the improvement which comprises carrying out the reaction in an alkaline aqueous methanol reaction medium, the aqueous methanol containing from about 15% to about 20% of water and having dissolved therein per liter about five moles of sodium.

References Cited in the file of this patent

Biltz: Berichte, vol. 44, pp. 411–13 (1911).
Hatt: J. Chem. Soc. (London), 1936, pp. 93–96.
Berichte, vol. 41, pp. 1379–93 (1908).
Chemical Abstracts, vol. 43, p. 1045 citing Ghosh, J. Indian Chem. Soc. 25, pp. 109–112 (1948).